J. M. GILBERT.
DENTAL BROACH HOLDER.
APPLICATION FILED NOV. 17, 1921.

1,404,519.

Patented Jan. 24, 1922.

Inventor
James M. Gilbert
By Jack Arthur
Attorney

UNITED STATES PATENT OFFICE.

JAMES M. GILBERT, OF DALLAS, TEXAS.

DENTAL-BROACH HOLDER.

1,404,519.  Specification of Letters Patent.  Patented Jan. 24, 1922.

Application filed November 17, 1921. Serial No. 515,919.

*To all whom it may concern:*

Be it known that I, JAMES M. GILBERT, a citizen of the United States, residing at Dallas, in the county of Dallas and State of Texas, have invented certain new and useful Improvements in Dental-Broach Holders, of which the following is a specification.

This invention relates to new and useful improvements in dental broach holders.

The object of the invention is to provide a simple and efficient holder that has highly improved means for securing a dental broach against displacement during operation.

A further object is to provide a holder that has external means for fastening a broach thereon.

A still further object is to provide a dental broach holder that may be easily cleaned and kept in a sanitary condition.

A construction designed to carry out the invention will be hereinafter described together with other features of the invention.

Figure 1:
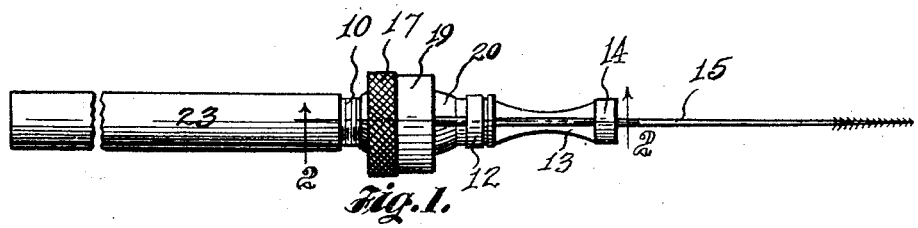
Figure 2:
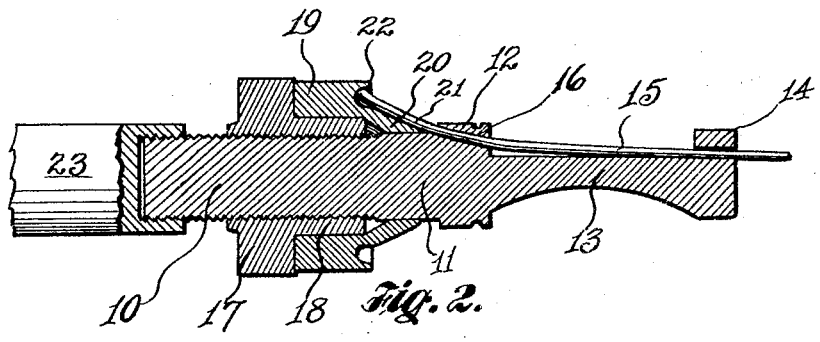

The invention will be more readily understood from a reading of the following specification and by reference to the accompanying drawings, in which an example of the invention is shown and wherein:

Fig. 1 is an enlarged elevation of a dental broach holder constructed in accordance with the invention, and Fig. 2 is an enlarged detail taken on the line 2—2 of Fig. 1.

In the drawings the numeral 10 designates an externally screw threaded mandrel having a smooth shank 11 on the end of which is an annular boss 12. Extending axially of the shank is an arm 13 which is provided with an eye 14 on its outer end. The sides of the arm are curved inwardly from each end to reduce it in thickness, one side being flattened to provide a seat for a dental broach 15. The boss 12 has an outwardly inclined aperture 16 in alignment with the eye 14.

A nut 17 having a forwardly directed reduced flange 18 is adapted to ride on the threads of the mandrel 10. A sleeve 19 is disposed on the mandrel in front of the nut 17 and has an integral conical collar 20 adapted to slide on the smooth shank 11 and engage under the butt 21 of the broach and thereby displace the same outwardly. An annular groove 22 is provided in one end of the sleeve between the outer edge thereof and the base of the collar, to receive the end of the butt.

It will be readily seen that the broach is inserted through the eye and the aperture 16, the butt of the broach being inclined outwardly. The flange 18 of the nut is adapted to ride under the sleeve 19 so that the nut engages the end of the sleeve. By operating the nut the sleeve is driven forwardly, the conical collar sliding under the butt of the broach and displacing the same outwardly at an acute angle to the aperture 16. As the collar slides under the butt of the broach the end engages in the annular groove whereby it is held against outward displacement.

It is pointed out that a holder embodying the invention provides means for positively securing a dental broach against displacement during operation. By operating the nut 17 in reverse order, it is obvious that the sleeve may be slid rearwardly disengaging the collar with the butt of the broach whereby the broach may be easily removed from the holder.

The outer end of the mandrel 10 may engage in the screw threaded socket of a handle 23.

It is evident that a holder constructed in accordance with the invention has no internal parts in which dust or unsanitary matter may accumulate. The broach is fastened on the outside of the holder and the fastening means being external may be easily kept in a sanitary condition. Furthermore, the fastening means positively prevent the loss of the broach in the patient's mouth during operation.

Various changes in the size and shape, as well as modifications may be made without departing from the spirit of the invention.

What I claim, is:

1. In a dental broach holder, a supporting member adapted to receive a dental broach, and means on the member for engaging the butt of the broach and displacing the same outwardly with relation to its receiving means.

2. In a dental broach holder, a supporting member having a forwardly disposed eye and an outwardly inclined aperture disposed inwardly of the eye, said eye and aperture adapted to receive a dental broach, and adjustable means on the member for engaging the butt of the broach and displacing the same outwardly with relation to the said aperture.

3. In a dental broach holder, a supporting member, means for receiving a dental broach, adjustable fastening means on the member, a conical collar carried by the fastening means and adapted to engage the butt of the broach and displace the same outwardly with relation to its receiving means, whereby the broach is secured against longitudinal displacement.

4. In a dental broach holder, a supporting member having an eye and an inclined aperture spaced from said eye, said eye and aperture adapted to receive a dental broach disposed longitudinally of the member, and adjustable means on the member adapted to wedge between the underside of the broach and the member, whereby the broach is secured against longitudinal displacement.

5. In a dental broach holder, a supporting member having a forwardly disposed eye and an outwardly inclined aperture disposed inwardly of said eye, said eye and aperture adapted to receive a dental broach, an adjustable nut on the member, and a sleeve having a forwardly directed conical collar disposed in front of the nut, said collar adapted to engage the butt of the broach and displace the same outwardly with relation to the said aperture.

6. In a dental broach holder, a supporting member adapted to receive a dental broach, a handle to which said member is attached, and means on the member for engaging the broach and displacing the same outwardly with relation to its receiving means for fastening said broach in position.

7. In a dental broach holder, an elongated supporting member having an eye at its outer end and an outwardly directed aperture disposed inwardly of said eye and substantially spaced therefrom, said eye and aperture being adapted to receive a dental broach, a nut adjustable on the member, and a sleeve receiving the nut and having a forwardly directed reduced collar engaging around the member, said collar being adapted to engage the butt of the broach and displace the same outwardly with relation to the aperture of the member and being provided with a groove for receiving the butt-end of the broach.

In testimony whereof I affix my signature.

JAMES M. GILBERT.